(12) United States Patent
Liu

(10) Patent No.: US 10,460,411 B2
(45) Date of Patent: Oct. 29, 2019

(54) REAL-TIME RESOURCE MANAGEMENT FOR ON-DEMAND SERVICES

(71) Applicant: Uber Technologies, Inc., San Francisco, CA (US)

(72) Inventor: Yifang Liu, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 415 days.

(21) Appl. No.: 15/251,845

(22) Filed: Aug. 30, 2016

(65) Prior Publication Data
US 2018/0060990 A1    Mar. 1, 2018

(51) Int. Cl.
*G06Q 50/30*     (2012.01)
*H04L 29/08*     (2006.01)
*G06Q 10/06*     (2012.01)

(52) U.S. Cl.
CPC ....... *G06Q 50/30* (2013.01); *G06Q 10/06311* (2013.01); *H04L 67/16* (2013.01); *H04L 67/18* (2013.01)

(58) Field of Classification Search
CPC .. G06Q 50/30; G06Q 10/06311; H04L 67/16; H04L 67/18
See application file for complete search history.

(56) References Cited

U.S. PATENT DOCUMENTS

| | | | |
|---|---|---|---|
| 6,356,838 B1 | 3/2002 | Paul | |
| 7,539,650 B2 | 5/2009 | Podgurny | |
| 7,783,516 B2 | 8/2010 | Stoffelsma et al. | |
| 7,827,104 B2 | 11/2010 | Posabella et al. | |
| 7,917,153 B2 | 3/2011 | Orwant et al. | |
| 7,930,098 B2 | 4/2011 | Huang | |

(Continued)

FOREIGN PATENT DOCUMENTS

| | | |
|---|---|---|
| CN | 1484172 | 3/2004 |
| CN | 101378581 | 3/2009 |

(Continued)

OTHER PUBLICATIONS

Office Action in AU2016208350 dated Jan. 19, 2018.

(Continued)

*Primary Examiner* — Dylan C White
(74) *Attorney, Agent, or Firm* — Mahamedi IP Law LLP (57) ABSTRACT

A method and system for determining and updating a value pertaining to supply and/or demand conditions of a service in a specified geographic region is provided. The method and system enable resources to be managed over multiple geographic regions. The system determines an initial value pertaining to supply and/or demand conditions in the specified geographic area based on data collected from provider and requester devices. The system determines whether the initial value requires real-time update to account for unpredictable and fast-changing variations in supply and/or demand conditions that can cause imbalance in resource allocation across the multiple geographic regions. If the system determines that the initial value requires real-time update, the system generates a real-time value based on supply and/or demand information pertaining to conditions in nearby geographic regions. The system facilitates the provision of the service using real-time value or the initial value, depending on the determination.

20 Claims, 6 Drawing Sheets

(56) References Cited

U.S. PATENT DOCUMENTS

| | | |
|---|---|---|
| 7,974,779 B2 | 7/2011 | Huang |
| 8,036,824 B2 | 10/2011 | Huang |
| 8,095,305 B2 | 1/2012 | Huang |
| 8,103,576 B2 | 1/2012 | Farrell et al. |
| 8,311,560 B2 * | 11/2012 | Kong ................... G06Q 10/02 455/456.1 |
| 8,538,374 B1 | 9/2013 | Haimo et al. |
| 8,554,608 B1 | 10/2013 | O'Connor |
| 8,624,727 B2 | 1/2014 | Saigh et al. |
| 8,630,897 B1 | 1/2014 | Prada Gomez |
| 8,634,804 B2 | 1/2014 | McNamara |
| 8,719,391 B2 | 5/2014 | Hamalainen et al. |
| 8,768,294 B2 | 7/2014 | Reitnour et al. |
| 8,855,916 B2 | 10/2014 | Meredith et al. |
| 9,066,206 B2 * | 6/2015 | Lin ....................... H04W 4/023 |
| 9,147,335 B2 | 9/2015 | Raghunathan |
| 9,305,310 B2 * | 4/2016 | Radhakrishnan .. G06Q 30/0283 |
| 9,424,515 B2 | 8/2016 | Atlas |
| 9,769,616 B1 * | 9/2017 | Pao ....................... H04W 4/023 |
| 9,843,897 B1 | 12/2017 | Lin |
| 10,104,605 B1 * | 10/2018 | Parshin ................ H04W 48/18 |
| 2002/0143587 A1 | 10/2002 | Champernown |
| 2003/0061179 A1 * | 3/2003 | Reece ................ G06Q 30/0283 705/412 |
| 2003/0084125 A1 | 5/2003 | Nagda et al. |
| 2003/0163378 A1 | 8/2003 | Podgumy |
| 2004/0103120 A1 | 5/2004 | Fickle |
| 2004/0219933 A1 | 11/2004 | Faith |
| 2005/0229219 A1 | 10/2005 | Posabella et al. |
| 2006/0034201 A1 | 2/2006 | Umeda et al. |
| 2006/0059023 A1 | 3/2006 | Mashinsky |
| 2006/0235739 A1 | 10/2006 | Levis et al. |
| 2007/0093247 A1 | 4/2007 | Raziq |
| 2007/0244730 A1 | 10/2007 | Johnson |
| 2008/0046356 A1 | 2/2008 | Farrell et al. |
| 2008/0195428 A1 | 2/2008 | O'Sullivan |
| 2008/0114629 A1 * | 5/2008 | Pavlov ................... G06Q 10/08 705/347 |
| 2008/0122691 A1 | 5/2008 | Carani et al. |
| 2008/0270019 A1 * | 10/2008 | Anderson .......... G01C 21/3438 701/533 |
| 2008/0270204 A1 * | 10/2008 | Poykko ................ G06Q 10/04 705/7.29 |
| 2009/0030749 A1 | 1/2009 | Drummond et al. |
| 2009/0037194 A1 | 2/2009 | Roche |
| 2009/0113296 A1 * | 4/2009 | Lacy .................. G01C 21/3667 715/700 |
| 2009/0176508 A1 * | 7/2009 | Lubeck ................ H04W 4/029 455/456.2 |
| 2009/0177502 A1 * | 7/2009 | Doinoff ................ G06Q 10/02 705/5 |
| 2009/0281844 A1 | 11/2009 | Probst |
| 2010/0017275 A1 * | 1/2010 | Carlson ................ G06Q 20/32 705/13 |
| 2010/0023376 A1 | 1/2010 | Brown |
| 2010/0280852 A1 * | 11/2010 | Huang .................... B60R 25/00 705/4 |
| 2010/0293030 A1 * | 11/2010 | Wu ..................... G06Q 10/06 705/7.36 |
| 2011/0060600 A1 * | 3/2011 | Fox ....................... G01S 19/51 705/1.1 |
| 2011/0112768 A1 | 5/2011 | Doyle |
| 2011/0131238 A1 | 6/2011 | Peeters et al. |
| 2011/0136468 A1 | 6/2011 | McNamara et al. |
| 2011/0231493 A1 | 9/2011 | Dyor |
| 2011/0307282 A1 | 12/2011 | Camp |
| 2012/0041675 A1 | 2/2012 | Juliver et al. |
| 2012/0046110 A1 | 2/2012 | Amaitis et al. |
| 2012/0101651 A1 | 4/2012 | Haynes |
| 2012/0200411 A1 | 8/2012 | Best |
| 2012/0215594 A1 | 8/2012 | Gravelle |
| 2012/0232943 A1 | 9/2012 | Myr |
| 2012/0239452 A1 * | 9/2012 | Trivedi .................. G06Q 10/00 705/7.22 |
| 2012/0246039 A1 * | 9/2012 | Fain ...................... G06Q 10/08 705/32 |
| 2012/0323642 A1 | 12/2012 | Camp et al. |
| 2013/0024249 A1 * | 1/2013 | Zohar .................... G06Q 10/06 705/13 |
| 2013/0030871 A1 * | 1/2013 | Schwitzky ............. G06Q 30/02 705/7.35 |
| 2013/0085817 A1 | 4/2013 | Pinkus |
| 2013/0090959 A1 | 4/2013 | Kvamme |
| 2013/0144831 A1 * | 6/2013 | Atlas ........................ G06N 5/02 706/50 |
| 2013/0173393 A1 | 7/2013 | Calman |
| 2013/0246207 A1 * | 9/2013 | Novak ............... G06Q 30/0283 705/26.2 |
| 2013/0290040 A1 * | 10/2013 | Perry ..................... G06Q 10/02 705/5 |
| 2013/0297674 A1 | 11/2013 | Jain |
| 2013/0310053 A1 | 11/2013 | Srivastava et al. |
| 2013/0339076 A1 | 12/2013 | Baranda |
| 2014/0032297 A1 | 1/2014 | Germann |
| 2014/0066090 A1 | 3/2014 | Henderson |
| 2014/0129302 A1 * | 5/2014 | Amin ..................... G06Q 50/30 705/13 |
| 2014/0229258 A1 * | 8/2014 | Seriani .................. G06Q 30/08 705/14.23 |
| 2014/0257681 A1 | 9/2014 | Kummamuru et al. |
| 2015/0031388 A1 | 1/2015 | Chatterjee et al. |
| 2015/0148060 A1 | 5/2015 | Parab et al. |
| 2015/0248689 A1 | 9/2015 | Paul |
| 2017/0138749 A1 * | 5/2017 | Pan ..................... G01C 21/3438 |
| 2018/0024826 A1 * | 1/2018 | Caushi ..................... G06F 8/65 717/172 |
| 2018/0336653 A1 * | 11/2018 | Levi .................... G06Q 30/0284 |
| 2019/0050879 A1 * | 2/2019 | Zhang ................ G06Q 30/0206 |

FOREIGN PATENT DOCUMENTS

| | | |
|---|---|---|
| CN | 101996485 | 3/2011 |
| CN | 102073970 | 5/2011 |
| JP | H 09153098 A | 11/1995 |
| JP | 2007249918 | 9/2007 |
| JP | 2011108194 | 6/2011 |
| KR | 2005/0119239 A | 12/2005 |
| KR | 2008/0044606 A | 5/2008 |
| KR | 10-2011-0061568 | 6/2011 |
| KR | 2011/0061414 A | 6/2011 |
| WO | WO 2003/040972 | 5/2005 |
| WO | WO 2010-123075 | 10/2010 |
| WO | WO 2011/067741 | 6/2011 |
| WO | WO 2013-166216 | 11/2013 |
| WO | WO 2014/074407 | 5/2015 |

OTHER PUBLICATIONS

Office Action in CN 2017111362851 dated Sep. 10, 2018.
Search Report accompanying Sep. 10, 2018 Office Action in CN 2017111362851 dated Aug. 30, 2018.
Office Action in CA 2,923,656 dated Aug. 21, 2018.
International Search Report in PCT/US2015/021227 dated Jun. 18, 2015.
Hai Yang et al. "Equilibria of bilateral taxi-customer searching and meeting on networks", Transportation Research Part B., 2010, vol. 44, pp. 1067-1083.
International Search Report and the Written Opinion as issued in PCT/US2013/048257, dated Oct. 22, 2013.
International Preliminary Report on Patentability as issued in PCT/2013/048257 dated Jan. 15, 2015.
International Search Report and the Written Opinion as issued in PCT/US2016/012688, dated Apr. 28, 2016.

* cited by examiner

REAL-TIME RESOURCE MANAGEMENT FOR ON-DEMAND SERVICES

BACKGROUND

In recent years, proliferation of and improvements to mobile computing devices and networking technology have resulted in the prevalence of on-demand services, including transportation and delivery services. Through these services, customers are able to submit requests for real-world services using mobile computing devices, such as smart phones, tablets, or personal computers. On-demand service systems match customer requests for service with one or more service providers to perform the requested service.

One of the challenges in such systems is the management of resources (e.g., service providers) over multiple geographic areas. Resources in an on-demand service system can be managed by determining supply and demand levels for the service across the geographic areas. The system can collect data pertaining to supply and/or demand levels and use the collected data to predict future supply and/or demand levels for each of the geographic regions.

DETAILED DESCRIPTION

Among other benefits, examples recognize that the dynamic nature of on-demand services lends to some variability and randomness with respect to estimating actual supply and/or demand and/or predicting near-term supply and/or demand. For example, random real-world events may cause actual or predicted current (e.g., real-time or instantaneous) supply and/or demand levels of a particular region to diverge from historical data. In addition, changes to supply and/or demand levels for a service can be ephemeral. For instance, a sudden spike in demand for the service in a particular region can quickly appear or disappear.

With greater use of on-demand services, there is also greater need to more finely granularize the temporal and/or geographical distribution of supply and demand. In the realm of transportation, for example, there are more users as riders, more users as drivers, and a greater number of services (e.g., pooling or single driver request) than previously before. Examples further recognize that the dynamic nature of urban environments can generate gluts (or over-abundances) and sparseness with respect to both supply and demand of an on-demand service. Examples recognize that with respect to on-demand services, instances of glut and sparseness represent ephemeral inefficiencies. Among other benefits, examples as described serve to detect and manage instances of gluts and sparseness with respect to supply and demand, resulting in a more optimal distribution and use of resources.

Embodiments described herein provide for a method for and a system capable of determining, in real-time, one or more conditions associated with providing a service to efficiently manage resources (e.g., service providers) among a plurality of geographic regions. The method and system described herein are particularly applicable to computerized, networked systems for facilitating or providing on-demand services.

A service that is requested by a rider or requester using a mobile computing device can include on-demand services, geographically-based (or location-based) services, and/or transport services. Such services can include, for example, a delivery service, a babysitting service, an entertainment service, a moving service, a food service, or a taxi service.

According to embodiments, the system determines an initial value pertaining to an estimated level of supply and/or demand of a service in a geographic region. The initial value can be determined based on an estimated or predicted number of requesters and providers in or around a geographic area using data collected by the system. The system can further determine, based on an evaluation of one or more criteria, whether the initial value needs to be adjusted to reflect current (e.g., instantaneous or real-time) supply and/or demand levels of the service in or near the geographic region. If the system determines that the initial value needs to be adjusted, because for example, of unpredicted glut or sparseness of supply and/or demand, the system computes or generates a real-time value based on supply demand information of nearby geographic regions.

As an example, an initial value can be calculated or determined to reflect a requester being located in a specified geographic region with few estimated or predicted requesters (e.g., based on data received from requesters in or around the specified geographic region in the preceding five or ten minutes). In such instances, the initial value can reflect relatively low levels of demand for the specified geographic region. This may lead to undesirable results in the management of resources (e.g., service providers) in or around the specified geographic region because nearby geographic regions may have much higher predicted or estimated demand and resources may be distributed accordingly (e.g., leading to sparseness of service providers in the specified geographic region). As a result, there may not be sufficient resources to handle any unpredicted or stochastic increase in demand in the specified geographic region as a result of the imbalance of the demand conditions between the specified geographic region and the nearby geographic regions. According to embodiments, examples herein resolve such inefficiencies and other issues by determining whether the initial value for the specified geographic region requires real-time update. If real-time update is needed, the system computes or generates a real-time value based on supply demand information of nearby geographic regions. The system facilitates the provision of the service using real-time value or the initial value, depending on the determination.

The initial and real-time values can be prices associated with providing the requested service. The prices may be determined and provided by the system relative to a default or normal price (e.g., 1.5× the default price or 0.75× the default price). The initial value can correspond to an initial price estimated based on an estimated level of supply and/or demand and the real-time value can correspond to a real-time price.

As described herein, a "user," a "requester," a "rider," or a "customer" are invariably used to refer to individuals that are requesting or ordering a service. Also as described herein, a "provider," a "service provider," a "supplier," or a "vendor" are invariably used to refer to individuals or entities that can provide the service. As an example, a user can request a service, such as a transportation or delivery service (e.g., food delivery, messenger service, food truck service, or product shipping) or an entertainment service (e.g., mariachi band, string quartet) using the system, and a service provider, such as a driver, food provider, band, etc. can communicate with the system and/or the user to arrange for the service. In addition, as described herein, "requester devices" and "provider devices" refer to computing devices that can correspond to desktop computers, cellular or smartphones, laptop computers, tablet devices, television (IP Television), etc., that can provide network connectivity and processing resources for enabling a user to communicate with a system over a network. A provider device can also correspond to taxi meters or other metering devices.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
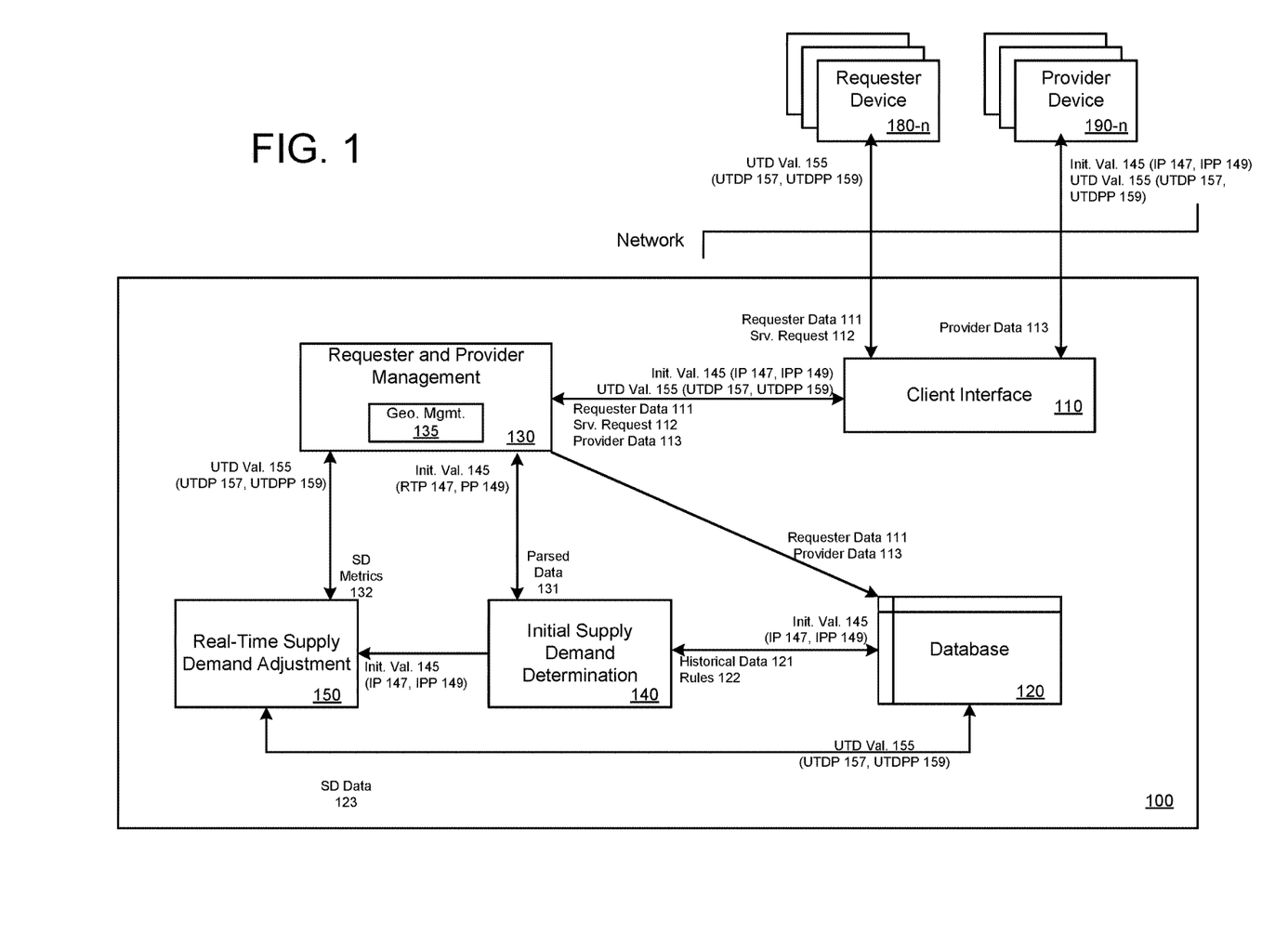
FIG. 1 illustrates an example on-demand service system for managing resources in multiple geographic regions, according to an embodiment.

FIG. 1 illustrates a system to detect and manage supply and demand conditions for an on-demand service, according to an embodiment. By way of example, a system 100 may be used to implement an on-demand service in which transportation can be requested by a first class of users (e.g., requesters and riders) and provided by a second class of users (e.g., providers or drivers). Among other benefits, system 100 can optimize the allocation of resources in connection with providing the on-demand service by detecting supply or demand conditions (e.g., sparse demand, over/under supply relative to demand) that are ephemeral (e.g., present over a portion of an hour, minutes or even less than a minute), and by implementing service conditions that result in re-distribution of the supply or demand condition. According to some examples, the system 100 can update a supply and demand value (e.g., price or pricing parameter) associated with the service in real-time to manage service providers (e.g., resources) over multiple geographic regions to account for random, fast-changing variations in supply and/or demand levels.

With further reference to FIG. 1, system 100 can use data received from requesters devices and service providers devices and/or data previously collected in order to determine an initial value (or parameter) pertaining to supply and demand conditions for a service request for a geographic region. The system 100 can provide the initial value to service providers, then evaluate whether the initial value needs to be adjusted to reflect current (e.g., real-time or instantaneous) supply and/or demand conditions of the region. If the system determines that the initial value needs to be adjusted, the system is able to quickly generate a real-time value (or parameter) pertaining to supply and demand conditions for the service request. The real-time value can be generated based on data or information associated with nearby geographic regions. The system 100 can provide the real-time value to the requester and/or a service provider (e.g., the provider selected or assigned by the system to perform the service). In this manner, the system can dynamically implement, in real-time, resource (e.g., providers) management decisions for the service when the real-time demand and/or supply conditions for the service are unpredictable (e.g., stochastic). A system such as described can be implemented in various contexts.

System 100 includes a client interface 110, a database 120, a requester and provider management 130, an initial supply demand determination ("ISDD") 140, and a real-time supply and demand adjustment ("adjustment") 150. In one implementation, the components of system 100 can combine to enable a service to be arranged between requesters (e.g., users who operate one or more requester devices 180) and service providers (e.g., individuals or entities who operate one or more provider devices 190). Components of system 100 can be implemented on network resources, such as one or more servers. System 100 can also be implemented through other computer systems in alternative architectures (e.g. peer-to-peer networks, etc.).

As an alternative or addition, some or all of the components of system 100 can be implemented on client machines, such as through applications that operate on the requester devices 180 and/or provider devices 190. For example, a client application can execute to perform one or more of the processes described by the various components of system 100. System 100 can communicate over a network, via a network interface (e.g., wirelessly or using a wireline), to communicate with the one or more requester devices 180 and the one or more provider devices 190.

The client interface 110 manages communications between system 100 and the requester devices 180 and the provider devices 190 over a network. Each of the requester devices 180 can download, store, and operate an application (s) that can interface with the client interface 110 in order to provide information to and/or receive information from the client interface 110. Similarly, service providers can operate their respective provider devices 190 to download, store, and operate an application(s) (e.g., a different application than the application used by a requester, or the same application) that can interface with the client interface 110. For example, the applications can include or use an application programming interface (API), such as an externally facing API, to communicate data with the client interface 110. The externally facing API can provide access to system 100 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure system 100 remains secure and only authorized users, service providers, and/or third parties can gain access to system 100.

Depending on different variations, the client interface 110 can receive, over a network, requester data 111 and service request 112 from one or more requester devices 180 and/or provider data 113 from one or more provider devices 190 at different times. In one implementation, system 100 can be configured (e.g., by an administrator that is not the requester or the service provider) to receive data from the requester devices 180 and/or the provider devices 190 at a particular time or every time a device 180, 190 accesses its respective application. For example, the client interface 110 can receive the requester data 111 and/or the provider data 113 periodically, at different instances in time, or based on a set schedule. The client interface 110 can also receive data for different durations in time (e.g., receive data for durations of five minute, thirty minutes, twenty four hours, etc.). In some implementations, data can be received from a requester device 180 when a user of the requester device 180 launches or operates the application (or performs other actions relating to the application or the requester device while the application is being run). Similarly, data can be received from a provider device 190 when a service provider launches or operates the application stored on the provider device 190 or performs other actions relating to the application or the requester device while the application is executing.

Using requester data 111 received from the requester devices 180 and provider data 113 received from the provider devices 190, system 100 can estimate information about supply and demand conditions in order to arrive at an initial supply demand value (e.g., initial value 145). In some examples, the requester data 111 can be used to estimate the current number and/or the current location of requesters for the service (e.g., an estimation of the demand for the service) over a given time interval. Similarly, the provider data 113 can be used to estimate the current number and/or the current location of available service providers capable of fulfilling the service (e.g., an estimation of the supply for fulfilling the service) over the given time interval.

Depending on implementations, the requester data 111 can include data indicating (i) a requester device launching an application used for requesting the service, (ii) a requester device requesting the service using the application (e.g., place an order), (iii) a requester device closing or shutting down the application, (iv) a current location of a requester device, (v) a destination or service location requested by a requester device, (vi) a route requested by a requester device, (vii) a type of service (e.g., a type or class of vehicle, or a type of food service) requested by a requester device, (viii) a profile associated with a requester device (e.g., a user's profile and/or account), (ix) a beginning time to start the service, or (x) an ending time for completion of the service.

For example, when a requester launches the application using a requester device 180 (e.g., smartphone) in order to request a service, the application can cause data, such as the requester's profile/account information, the current location of the requester (e.g., the current location of the device), and the service destination of the customer, to be provided to the client interface 110 over the network. Other types of requester data 111 can also be received from the requester devices 180, such as the current date and time, the number of people requesting the service using the requester device (e.g., the number of people in the party), the type of the requester device, and version information of the application running on the requester device.

In other examples, the provider data 113 can include data indicating (i) an availability of a service provider, (ii) a current state of a service provider (e.g., currently providing a service, currently idle, out of commission, etc.), (iii) a current location of a provider device, (iv) a type of service (e.g., a type or class of vehicle) of a service provider, (v) a current data or time, or (vi) a profile associated with a provider device (e.g., a service provider's profile and/or account). The provider data 113 can also include data that indicates the type of the provider device and version information of the application running on the provider device. Once the data is received (and/or while the data is being received) over the network, the client interface 110 can provide the received requester data 111 and the received provider data 113 to requester and provider management 130 and provider management 130, respectively.

Service request 112 can correspond to requests for one or more actions by the system 100 from requester device 180. Service request 112 can correspond a request for up-to-date supply demand value (e.g., price or price parameter) from the system 100 or a request for service to be performed by one or more service providers. In response to the service request 112, the system 100 can determine up-to-date supply demand value for the service and/or select a provider from a pool or inventory of providers to perform the requester service. According to embodiments, application(s) on the requester device 180 is configured to transmit service request 112 along with requester data 111 to client interface 110.

If the service request 112 corresponds a request from the requester device 180 for the system 100 to provide up-to-date supply demand value, the requester and provider management 130 can cause the adjustment 150 to determine an up-to-date value 155. If the service request 112 corresponds to a request for service (e.g., a request for transportation service) from the requester device 180, the requester and provider management 130 can cause the system to assign a provider (out of a pool or inventory of available providers) to provide the service for the requester.

The requester and provider management 130 receives requester and provider data 111 and 113, handles and processes the data, and stores the data in one or more memory resources (e.g., in one or more databases 12-0 that are accessible by components of system 100). In one example, the requester and provider management 130 processes requester data 111 and provider data 113 that has been transmitted to system 100 by the requester devices 180 and provider devices 190, respectively. In another variation, different components can receive and process data from requester devices 180 and provider devices 190. Because the client interface 110 can receive a large amount of data from the requester devices 180 and the provider devices 190, the requester and provider management 130 handles and organizes the requester data 111 and the provider data 113 for storage in one or more databases 120. For example, some of the data can be deleted, categorized, organized into tables (e.g., based on time and/or date), indexed, or archived so that components of system 100 can easily access the data from the databases to retrieve necessary information.

In some variations, the requester and provider management 130 can also handle the authentication of the respective devices (and their users) for interacting with system 100. For example, for each requester device 180 that provides requester data 111 to system 100 (e.g., in response to the users operating the application for requesting a service), the requester data 111 can include account or user information provided by the user (e.g., a username, a password, a security token etc.). The requester and provider management 130 can authenticate the users before enabling the users to request the service. The requester and provider management 130, for example, can compare the information provided by the requester device 180 with account or user information stored in a database (e.g., in response to the user previously registering or registering his or her devices) to determine if there is a match. Similarly, the requester and provider management 130 can authenticate the service providers (and their provider devices 190) to verify the identity of the service providers. In some implementations, the requester devices 180 and the provider devices 190 can exchange information (e.g., allow data sharing over the network) with the client interface 110 only after the users and service providers have been authenticated.

The requester and provider management 130 can also process and parse the received data in order to determine relevant information that the initial supply demand determination ("ISDD") 140 can use to determine an initial supply and demand value for the service. The ISDD 140 can determine one or more initial values 145 reflecting an estimate of supply and demand conditions based on received data. According to some examples, the ISDD 140 can make the determination for the service based on the estimated amount of requesters requesting the service and the estimated amount of available service providers that can fulfill the requests. The initial value 145 can reflect, for example, a ratio, a classification (e.g., low demand, high demand) or other parameter. In some examples, the initial value 145 includes or corresponds to an initial price (IP) 147 or an initial pricing metric (IPP) 149 (e.g., a multiplier). The ISDD 140 can determine the initial value 145 for a specific interval of time (e.g. preceding five or ten minutes) and for a specific geographic region. The ISDD can also be configured to determine a plurality of initial values 145, each pertaining to a corresponding one of a plurality of geographic regions.

According to some examples, the parsed data 131 can correspond to information that can be used by the ISDD 140 to estimate an amount of requesters for a service and an amount of available service providers at the given time. The requester and provider management can provide the parsed data 131 periodically (e.g., every five minutes or every ten minutes) to the ISDD 140 such that the ISDD 140 can generate an initial value 145 periodically (e.g., every five minutes or every ten minutes) based on the latest received parsed data 131. The parsed data 131 can include information about the current time, the current location of requester devices, current location of provider devices, state (e.g., available or unavailable) of the provider operating each of the provider devices, type of equipment or vehicles available or being requested, and/or service locations (e.g., pick-up, drop-off, or delivery locations).

According to an embodiment, a sub-component of the requester and management 130—geographic management 135—defines and manages a number of geographic regions. For example, a city or metro area (e.g., San Francisco or New York) can be divided into multiple geographic regions by the geographic management 135. The system 100 manages requesters and providers based (in part) on the region(s) in which the requesters and providers are located. For example, at any particular time, the same initial value 145 pertaining to supply demand conditions (e.g., an initial price 147 or initial pricing parameter 149) can be applied to all service requests located in the same geographic region.

Figure 2:
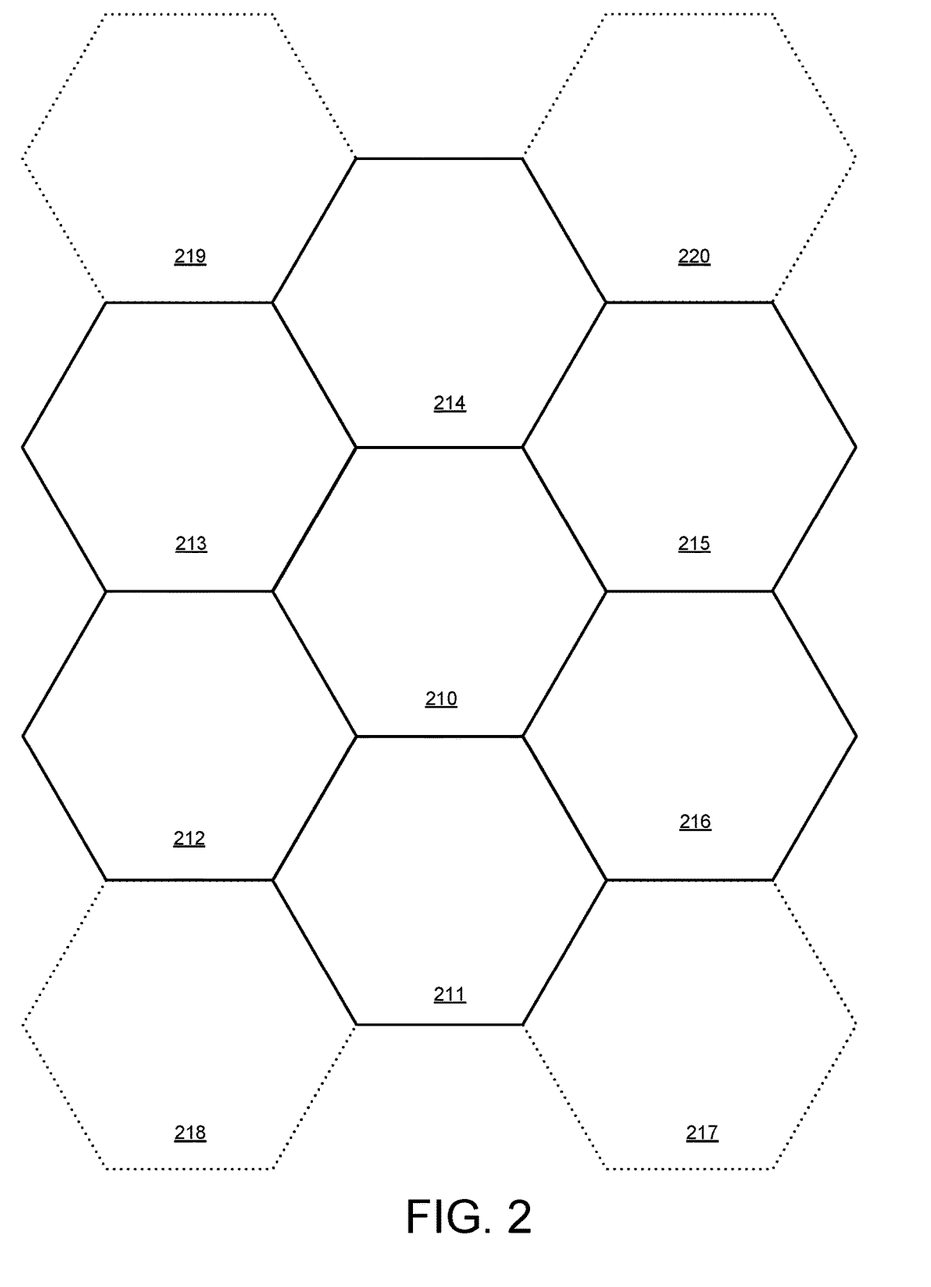
FIG. 2 illustrates an example definition of a geographic area that includes multiple geographic regions, in connection with managing an on-demand service system, according to an embodiment.

FIG. 2 illustrates an example definition of a geographic area that includes multiple geographic regions, in connection with managing an on-demand service system. As one example, geographic management 135 can define and manage a geographic area by defining and utilizing geographic regions such as the ones (210-220) illustrated in FIG. 2. In FIG. 2, geographic region 210 has immediately adjacent neighboring geographic regions 211-216. In contrast, geographic regions 217-220 are not adjacent to geographic region 210. The geographic regions may be defined as any geometric shape, including squares, pentagons, hexagons (as depicted in FIG. 2), etc. In some embodiments, the geographic regions are defined according to boundaries of neighborhoods, towns, or counties. In other variations, boundaries of geographic regions may be streets, rivers, or other geographical features. According to the embodiments, the geographic regions may be defined such that areas within each geographic region exhibit certain similarities. For instance, the system may define the geographic regions such that the area within each geographic region exhibit similar trends with respect to supply and/or demand for the service. Embodiments can allow for the geographic regions to be varied in size for determinations of supply and demand conditions, in order for the system to optimize such determinations for one or more geographic regions.

Referring back to FIG. 1, the geographic management 135 can receive requester data 111 (or a portion thereof) to determine in which geographic region the requester device 180 is located (e.g., region 210). Similarly, the geographic management 135 can receive provider data 113 (or a portion thereof) to determine in which geographic region the provider device 190 is located (e.g., region 220). In some embodiments, these functionalities can be implemented as a portion of the requester and provider management 130 rather than as a sub-component thereof.

The requester and provider management 130 can continually or periodically store requester data 111 and provider data 113, as well as the parsed data 131 to the appropriate system databases 120 so that a historical record can be maintained. The historical record can include requester data 111 and provider data 113 received at particular dates and times previously received by system 100. In some examples, the historical record can also be used to approximate the amount of requesters and the amount of service providers at a particular geographic region at a certain time and/or date. In this manner, information can be collected, stored, and maintained for future use (e.g., for price determination at a later time or for predicting future supply and demand for the service). For example, the data collected on Friday evenings can be useful in predicting supply and demand for future Friday evenings (e.g., can be used to determine trends). Forecasting future spikes in demand, for example, can be useful in making sure a sufficient amount of service providers are available at the future time to meet the high demands. These and other historical records can be provided from the system databases 120 to the ISDD 140 as historical data 121.

The system databases 120 can also include a rules or models database, which store entries corresponding to rules and/or models used by the ISDD 140 for making determinations for the initial value 145. For example, the models can include relevant economic models for adjusting prices (or pricing parameters) for services based on supply and demand. The rules and models database can include rules for limiting the initial price (e.g., set a ceiling and/or a floor). For example, a rule can place a limit on the price for the service to be adjusted by preventing the price from being adjusted to more than three times the default price (e.g., max increasing adjustment is 3×). Similarly, the limit can prevent the price from being adjusted to less than 0.5 times the default price (e.g., max decreasing adjustment is 0.5×).

The ISDD 140 receives the parse data 131 from the requester and provider management 130 to determine an initial value 145 for the service for a geographic area. In example embodiments, the ISDD 140 performs an initial determination of each of a plurality of geographic regions. For instance, the ISDD 140 determines an initial value 145 for each of a plurality of geographic regions defined for the San Francisco area. Furthermore, the ISDD 140 can periodically generate initial values 145. For example, the ISDD 140 can receive parsed data 131 every five minutes and can generate, based on the latest received parsed data 131, an initial value 145 for a geographic region.

The initial value 145 can correspond to a price for the service such as an initial price (IP) 147 or an initial pricing parameter (IPP) 149. The IPP 149 can be a multiplier relative to a default price or rate. For example, the ISDD 140 can determine that the IPP 149 should be set to 1.2× of the default price or rate. Similarly, the ISDD 140 can determine that the IPP 149 should be set to 0.7× of the default price or rate. The default price or rate can correspond to different types of fees or costs for a service. For example, the default price can be a cost per amount of time (e.g., dollar per minute), a cost per amount of distance traveled (e.g., dollar per mile), a flat fee or rate, or a combination thereof. In addition, the default price can be dependent on the particular requests or specific requirements set by a requester or a service provider. For example, the service can cost a certain amount (e.g., a default price) for different geographic locations, at different times, at different pickup or drop off locations, for types of vehicles requested, for different amounts of users riding the same vehicle, or a combination of any of the different requests or requirements.

The ISDD 140 estimates a number of requesters for a service at a given time and a number of available service providers at the given time. The ISDD 140 can make this estimation for a given geographic region and/or across multiple geographic regions. For instance, the ISDD 140 can determine that certain service providers, although available, are located too far away to fulfill service requests in a particular geographic region. Thus, these service providers would not be factored into the estimation of the available service providers available to provide services in the given geographic region. In this manner, the ISDD 140 can estimate the demand (e.g., number of requesters) and the supply (e.g., number of available service providers available to fulfill the request) in or near a given geographic region and at the given time. In one implementation, the ISDD 140 can make these estimations using parsed data 131 received from the requester and provider management 130 or from one or more system databases 120. In addition, the ISDD 140 can make these estimations using historical data 121 received from the one or more system databases 120.

Historical data 121 can be data pertaining to supply and demand levels that is comparable to or predictive of the current time in the given geographic region. For example, if the current time is 5 PM on a weekday (e.g., evening rush hour), historical data 121 can be data collected in the past on weekdays during the evening rush hour in the same geographic region (or nearby geographic regions). The historical data 121 can also take into account holidays or scheduled events. For instance, if the ISDD 140 is estimating supply and demand levels for a holiday (e.g., Thanksgiving Day), the historical data 121 can be data collected in the same geographic region (or nearby geographic regions) during past Thanksgiving holidays. Similarly, if the initial price determination is estimating supply and demand levels after the conclusion of a scheduled event (e.g., a baseball game at a stadium in San Francisco), the historical data 121 can be data collected after a similar event in the same geographic region (or nearby geographic regions).

Based on estimated number of requesters and available service providers in or near a geographic region, the ISDD 140 can apply one or more rules or models 122 in order to determine the initial price for the service. For example, a model or rule used to determine the initial price can be based on a utilization factor. The utilization factor can indicate a percentage (e.g. 50% or 75%) of service providers that are currently performing or providing the service compared to the total number of service providers in or near the given geographic region. For instance, the model or rule can provide that if the utilization factor is below 50% for the given region, the initial price should be set to the default price. On the other hand, the model or rule can provide that if the utilization factor is above 50% for the given region, the initial price should be set to 1.5× the default price. In other variations, the one or more rules or models 122 can provide the initial price as a function of the utilization factor and/or other parameters. There can also be different rules or models for different geographic regions.

The ISDD 140 can also receive data from outside sources or other stored in the one or more system databases 120. For instance, the ISDD 140 can receive weather information, traffic conditions, or any other information or data that can assist in estimating the supply and/or demand levels pertaining to a given geographic region.

After it is determined by the ISDD 140, the initial value 145 is transmitted to the requester and provider management 130. The requester and provider management 130 can transmit the initial value 145 to the client interface 110 which in turn transmits it to provider devices 190 over the network. Application(s) running on the provider devices 190 can cause graphics representative of the initial value 145 to be displayed on displays on the provider devices 190. In this manner, providers operating provider devices 190 can access estimated supply and demand conditions. For instance, the provider devices 190 can display a map illustrating a plurality of geographic regions and overlay information representative of the initial values 145 for each of the plurality of geographic regions on the map. Because ISDD 140 can periodically determine the initial value 145 based on received parsed data 131, the provider devices 190 can also periodically receive initial value 145 and update the displays on the provider devices 190 accordingly.

The initial value(s) 145 can also be received by the real-time supply demand adjustment ("adjustment") 150 and one or more system databases 120. According to embodiments, the one or more system databases 120 store or cache the initial value(s) 145 such that the estimated supply and demand condition information for each of the plurality of geographic regions (e.g., 210-220 of FIG. 2) such that initial value 145 corresponding to each geographic region can be readily accessed by the system 100 or its components (e.g., adjustment 150). The initial value 145 can also be stored in the databases 120 as historical records.

The adjustment 150 receives the initial value 145 from the ISDD 140 and supply demand metrics ("SD Metrics") 132 from the requester and provider management 130 to determine if the initial value 145 requires a real-time adjustment. The adjustment 150 can make this determination based on the service request 112 received from the requester device 180. For example, a service request 112 can specify a location and can correspond to a request for up-to-date supply demand condition information for that specified location. The specified location can be a service location (e.g., a pick-up, drop-off, or delivery location) or a location of the requester device 180. The system 100 can determine a specified geographic region that corresponds to to the specified location. In some examples, the requester device 180 can determine the specified geographic region based on the specified location.

The SD Metrics 132 can be one or more criteria used by the adjustment 150 to determine whether or not the initial value 145 requires a real-time adjustment to, for example, account for unpredictable/stochastic variations in supply and/or demand. The SD Metrics 132 can be compared against one or more threshold values. In certain examples, the threshold values are stored in the one or more system databases 120. The threshold values can also be dynamically calculated by the adjustment 150 or the requester and provider management 130.

One example of SD Metrics 132 is an estimated time of arrival (ETA) of a service provider to the requester's location (e.g., determined using requester data 111 received from the requester device 180) or a specified service location (e.g., pick-up, drop-off, or delivery location specified in the service request 112). For instance, if an available service provider has an ETA above a threshold time duration, the adjustment 150 determines that the initial value 145 requires adjustment due to fast-changing/stochastic variations in supply and/or demand. The available service provider could be the nearest one in distance to the location of the requester device 180 or the specified service location. The available service provider could also be the one with the shortest ETA to the location of the requester device or the specified service location. Another example of SD Metric 132 is a distance between an available service provider (e.g. nearest one in distance) to the location of the requester device 180 or the specified service location. If the distance is above a threshold distance, the adjustment 150 determines that the initial value 145 requires adjustment due to fast-changing/stochastic variations in supply and/or demand. As another example, the adjustment 150 can determine that the initial value 145 requires real-time adjustment if a utilization factor of one or more geographic regions is above a threshold factor. The adjustment 150 can also use a combination of the aforementioned criteria, along with others, to determine whether the initial value 145 requires real-time adjustment.

The adjustment 150 outputs an up-to-date value 155 to the requester and provider management 130. Up-to-date value 155 can correspond to a price for the service such as an up-to-date price ("UTDP") 157 or an up-to-date pricing parameter ("UTDPP") 159. The UTDPP 159 can be a multiplier relative to a default price or rate. According to embodiments, if the adjustment 150 determines that initial value 145 does not require real-time adjustment, the adjustment 150 outputs the value of the initial value 145 as the up-to-date value 155. If the adjustment 150 determines that the real-time price requires real-time adjustment, the adjustment 150 computes or generates a real-time value and outputs the real-time value as the up-to-date value 155.

According to embodiments, the adjustment 150 computes or generates the real-time value based on supply demand data ("SD Data") 123 received from one or more system databases 120. The SD data 123 can indicate supply demand conditions of nearby geographic regions. As one example, the SD Data 123 can indicate supply demand conditions of a geographic region that is immediately adjacent to the specified geographic region (e.g., a geographic region in which a service location or a requester device 180 is located). As one example and with reference to FIG. 2, for specified geographic region 210, the adjustment 150 can receive SD Data 123 that pertains to the supply demand conditions in geographic regions 211-216 from database 120. SD data 123 can indicate a price or a pricing parameter (e.g., 0.8× or 1.1×) associated with the service for the nearby geographic regions.

In some implementations, the SD Data 123 includes data or information using which the adjustment 150 can compute a probability of a service request being fulfilled by one or more service providers from a nearby geographic region. For instance, for specified geographic region 210 (e.g., service location or requester device located in geographic region 210), the adjustment 150 can receive SD Data 123 to compute probabilities of the service request 112 being fulfilled by service providers located in each of the adjacent geographic regions 211-216. Data or information used to compute these probabilities can include parameters or variables relevant to the system 100's assignment of service providers to particular service requests, including utilization factors of the geographic regions, numbers of available service providers located in the geographic regions, numbers of requesters located in the geographic regions, traffic conditions in or between the geographic regions, distances between the service providers and the requester, ETA of the service providers to the location of the requester or the service location, difference in the price or pricing parameter between the geographic regions, etc. As an alternative or in addition, data or information used to compute the probabilities can be retrieved from the requester and provider management 130, one or more system databases 120, and one or more outside sources.

According to certain embodiments, after receiving SD Data 123, the adjustment 150 is configured to determine whether the data or information therein (or a subset of data or information) requires real-time adjustment. The adjustment 150 is configured to compute or generate real-time supply demand information in response to the determination that any subset of SD Data 123 requires real-time adjustment. As an example, to determine a real-time value for geographic region 210, the adjustment 150 receives SD Data 123 pertaining to geographic regions 211-216. The adjustment 150 determines whether real-time adjustment is needed for each of the geographic regions 211-216. The adjustment 150 can make these determinations using SD Metrics 132

(e.g., an ETA of a service provider, a distance between a service provider and service location, and/or a utilization factor) for each of the geographic regions 211-216. For instance, the adjustment 150 can determine that data pertaining to geographic region 211 requires a real-time update, and proceeds to compute a real-time value for geographic region 211. The adjustment 150 can compute the real-time value for region 211 using supply demand data pertaining to 211's neighboring geographic regions, including regions 212 and 216-218. In this manner, the adjustment 150 ensures that SD Data 123 pertaining to each of geographic regions 211-216 are up-to-date before using SD Data 123 to compute a real-time value for geographic region 210.

The up-to-date value 155 (with a value of the initial value 145 or the computed real-time value) is transmitted to the requester and provider management 130 and the system databases 120. The requester and provider management 130 can provide the up-to-date value 155 to the client interface 110. According to embodiments, the requester and provider management 130 can inform or control the client interface 110 to transmit the up-to-date value 155 to the requester device 180 in response to the service request 112 (e.g. a request for up-to-date pricing or a request for service). In addition, the requester and provider management 130 can inform or control the client interface 110 to transmit the up-to-date value 155 to a provider device 190 operated by a provider that has been selected by the system 100 to provide the service in response to service request 112. The system databases 120 can store and categorize the up-to-date value 155 received from the adjustment 150 such that the latest supply demand condition information can be quickly provided to the system 100.

Methodology

Figure 3A:
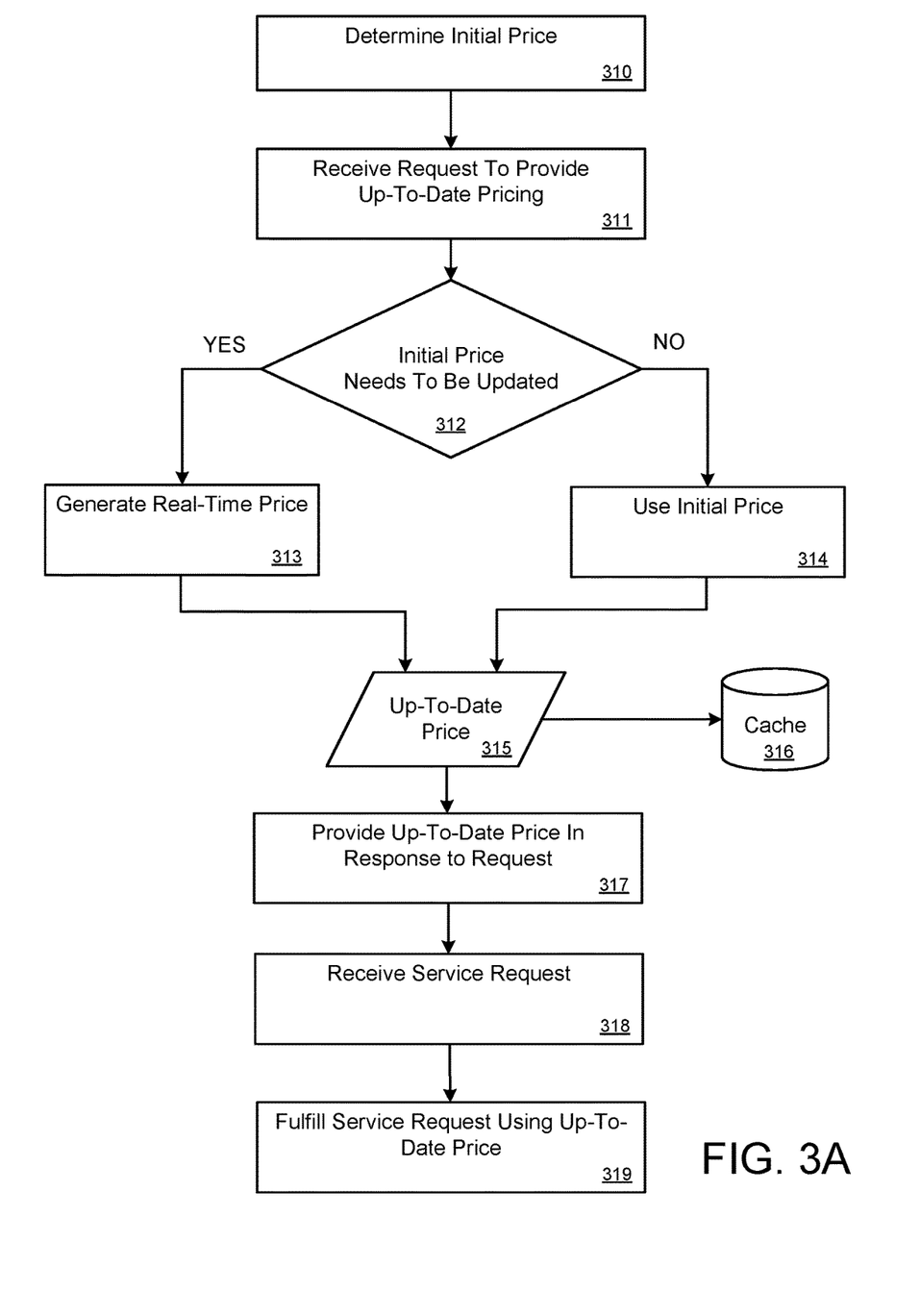
FIG. 3A illustrates a method performed by an on-demand service system to determine an up-to-date value pertaining to supply and demand conditions for a service to manage resources, according to an embodiment.

FIG. 3A illustrates an example method for operating an on-demand service system, according to an embodiment. In some examples, the system manages resources for providing an on-demand service (e.g., service providers) over multiple geographic regions by dynamically adjusting a price for the service in a specified geographic region, in response to a determination that supply and demand conditions exist which at least temporarily reflect an imbalance for a specified region.

At step 310, the system determines an initial price of the service for a specified geographic region (e.g., region 210 of FIG. 2). The specified geographic region can be one indicated in a service request (e.g., service request 112) from a requester device (e.g., requester device 180). The system can also determine the specified geographic region based on a location indicated in the service request. The location indicated in the service request can be a service location (e.g., pick-up, drop-off, or delivery location) or a location of the requester device (e.g., requester device 180) determined using location data (e.g., GPS or GLONASS data) transmitted by the requester device.

Referencing FIG. 1, the initial price can be IP 147 and/or IPP 149 determined by the ISDD 140. In some examples, the ISDD 140 approximates or estimates an amount of requesters and an amount of available service providers at a given time using data (e.g. parsed data 131) received by the ISDD 140. Based on the estimated amount of requesters and amount of available service providers, the ISDD 140 can apply one or more rules or models (e.g. rules 122) to determine the initial price.

The system can determine the initial price periodically. For example, the system can determine the initial price every five minutes based on data collected from requester and provider devices in the preceding five minutes or ten minutes. In this manner, the initial price can be determined based on short-term trends (e.g., over the previous five minutes or ten minutes) in supply and/or demand. The system can periodically determine initial prices for all or a subset of a plurality of geographic regions defined in an area (e.g., San Francisco or New York City) in step 310.

In addition, the determination in step 310 can include applying optimization techniques. For instance, the system can optimize the determination in step 310 such that the initial prices determined for nearby or adjacent geographic areas are within a certain amount or percentage points from each other. As an example, the system can ensure that the initial price determined for region 210 (of FIG. 2) is not more than 150% or less than 50% of the initial price determined for adjacent region 211. In addition, the system can maintain a set of threshold values to ensure that the initial price does not exceed or fall below those values.

After the initial price is determined at step 310, the system is configured to provide the initial price to users and/or third parties. For instance, the system can transmit the initial price to provider devices (e.g., provider devices 190 of FIG. 1). Applications executing on the provider devices 190 can cause the initial prices for each of the multiple geographic regions to be visually displayed on the provider devices 190. For instance, applications executing on the provider devices 190 can display a map of the plurality of geographic regions and overlay graphics reflective of the initial prices for each of the geographic regions on the map. In this manner, service providers can be apprised of short-term pricing information and supply/demand conditions for each of the geographic regions.

At step 311, the system receives a request to provide up-to-date pricing. This request (e.g., service request 112) can be a communication over the network from a requester device (e.g., requester device 180) to the system. The request can be transmitted from the requester device 180 when a requester opens an application on a requester device or performs an action (e.g., interaction with a graphical user interface option) in the application on the requester device. Furthermore, the application can cause the requester device to transmit the request in response to the requester selecting a location, such as a pickup location or a drop off location, on the graphical user interface of the application executing on the requester device. Location data of the requester device and/or a service location (e.g., pick-up, drop-off, or delivery location) can be transmitted to the system as part of, or along with, the request.

At step 312, the system determines whether the initial price for the specified geographic region requires real-time adjustment. The system can make this determination based on one or more supply demand metrics (e.g., SD Metrics 132 of FIG. 1). Using the metrics, the system can determine whether the initial price requires adjustment due to fast-changing/stochastic variations in supply and/or demand levels in or around the specified geographic region. If the system determines that real-time adjustment is needed, the system generates a real-time price at step 313. On the other hand, the system determines tha the initial price does not need to be updated, the system proceeds with the service request using the initial price at step 314.

The metrics used in the determination of step 312 can include an ETA of a provider (e.g., provider with the shortest ETA) to a service location (e.g., pick-up location) or a location of the requester (e.g., determined using location data received from the requester device), a distance between a provider (e.g., closest provider) to the service location or the location of the requester, a utilization factor, or a combination thereof. The metrics can be compared against one or more thresholds to determine whether initial price requires real-time adjustment. As one example, if the distance between the closest available provider to a service location is above a threshold distance, the system can determine that real-time adjustment is needed.

If the system determines, at step 312, that the initial price needs real-time adjustment, the system generates a real-time price at step 313. According to an embodiment, the real-time price can be generated based, at least in part, on supply demand data (e.g., SD Data 123) pertaining to nearby geographic regions. The supply demand data can be prices or pricing parameters associated with each of the nearby geographic regions. Referring to FIG. 2 for example, a real-time price of region 210 (e.g., the specified geographic region) may be computed or generated based on pricing information of adjacent geographic regions 211-216. Pricing information of nearby but non-adjacent geographic regions 217-220 are not used directly to generate the real-time price of geographic region 210. In other embodiments, the system can utilize pricing information of nearby regions such as regions 217-220 in the computation of the real-time price of region 210.

The real-time price determination can be based (in part) on a computed or estimated probability that the service request would be fulfilled by a provider from a particular nearby geographic region. As one example, the real-time price of geographic region 210 can be determined as the sum of the products (i.e. results of multiplication) of a price of the service in each of the neighboring geographic regions 211-216 with a probability that the service request would be fulfilled by a provider in a corresponding one of the neighboring geographic regions 211-216. As another example, the system can evaluate expressions such as the following to determine the real-time price:

$$RTP_i = \sum_{j \in (nearby\ regions)} P_j F_j O$$

$RTP_i$ denotes the real-time price of a region i (e.g., the specified geographic region). j denotes a current one of the nearby regions to region i. Pricing information of the nearby regions are used to determine the real-time price of region i. $P_j$ denotes the probability that a service request would be fulfilled by a service provider from region j. And $F_j(\ )$ denotes a pricing function pertaining to region j. The pricing function can be a function of variables such as a current price of the service in region j, a distance between regions i and j, an ETA of one or more service providers from region j to region i, a number of available service providers in region j, a number of requesters in region j, etc.

The probability can be computed by the system (e.g., by the adjustment 150 of FIG. 1) based on one or more parameters pertaining to the neighboring region such as a number of requesters, a number of available service providers, and a utilization factor. The probability can also be computed based on an ETA of one or more service providers located in the neighboring region to the requester's location (as determined by location data transmitted by requester device 180) or a pickup location specified by the requester.

According to embodiments, as part of the determination of the real-time price, the system is configured to determine whether a real-time adjustment is needed for pricing information pertaining to the neighboring geographic regions to account for fast-changing/stochastic variations in supply and/or demand levels. For instance, a specified geographic region 210's real-time price can be determined by the system using pricing information for geographic region 210's immediately adjacent neighboring regions 211-216. At the outset of the determination of the real-time price of region 210, the system can determine whether prices corresponding to regions 211-216 require real-time adjustment. The determination can be made in the same manner as described in step 312 with respect to specified geographic region 210. For each nearby geographic region for which adjustments need to be made, the system computers a real-time price. In this manner, the system ensures region 210's real-time price is computed using neighboring regions' prices that are adjusted to reflect fast-changing/stochastic variations in supply and/or demand levels.

After the real-time price for the specified geographic region has been generated by the system at step 313, the system stores the real-time price as an up-to-date price at step 315. The system can store the up-to-date price in a cache 316 or a database accessible to the system (e.g. the one or more system databases 120). If the system determines, at step 312, that the initial price does not need to be updated, the system uses the initial price as the up-to-date price at step 315.

At step 317, the system responds to the request from the requester device received in step 311 by providing the up-to-date price to the requester device. The client application executing on the requester device (e.g., requester client application) can cause the received up-to-date price to be displayed on the requester device such that the requester can make a decision whether to initiate a service request at the up-to-date price. The requester client application can display a user interface for the requester to acknowledge the up-to-date price before the service request is initiated.

At step 318, the system receives the service request from the requester device. In response, the system is configured to fulfill the service request at step 319. As part of this step, the system assigns a service provider from a pool of service providers to provide the requested service. The system can transmit or provide the up-to-date price to the assigned service provider. A client application executing on the provider device of the assigned service provider can cause the assignment to be displayed on the provider device. The up-to-date price received by the provider device can be displayed as part of the assignment on the provider device. The provider can confirm or reject the assignment using the provider client application. If the provider confirms the assignment (or proceeds without rejecting the assignment), the system associates the up-to-date price with the service transaction between the requester and the assigned provider. If the provider rejects the assignment, the system is configured to assign another service provider and/or generate another up-to-date price.

Requester Examples

Experience of customers (e.g., requesters), according to an embodiment of the on-demand service system, is discussed below with reference to FIGS. 1-3. Each client device (e.g., 180 of FIG. 1) is configured to receive pricing information (e.g., UTDP 157 or UTDPP 159) for one or more geographic regions from the system (e.g., 100 of FIG. 1). For instance, a requester device can receive pricing information pertaining to a geographic region specified in a request from the requester device to the system. The specified geographic region may be a region in which the requester device or a service location (e.g., pickup, drop off, or delivery location) is situated. Requester client application executing on the client device can cause the pricing information to be displayed on the provider device.

According to certain embodiments, the system transmits up-to-date pricing information for the specified geographic region to the requester device. The up-to-date price can be determined by the system in steps 312-315 of FIG. 3A. In some instances, the up-to-date price is equal to the initial price determined in step 310 (e.g., the initial price did not require real-time adjustment). In other instances, the up-to-date price is a real-time price generated by the system in step 313 (e.g., the initial price required real-time adjustment).

In some implementations, the requester device receives up-to-date pricing information pertaining to the specified geographic region but not the initial price. Thus, each time the requester interacts with the requester client application (e.g., opening the requester client application, interacting with the graphical user interface of the requester client application, requesting a price estimate, or submitting a request for service), an up-to-date price (e.g., UTDP 157 or UTDPP 159 of FIG. 1) is provided to the requester device. In this manner, the requester is always provided a price that is adjusted for fast-changing/stochastic variations in supply and/or demand levels.

Provider Examples

Experience of service providers, according to an embodiment of the on-demand service system, is discussed below with reference to FIGS. 1-3. Each provider device (e.g., 190 of FIG. 1) is configured to receive pricing information for one or more geographic regions from the system. For instance, a provider device can receive pricing information for each of the geographic regions depicted in FIG. 2 (e.g., regions 210-220). A provider client application executing on the provider device can cause the pricing information to be displayed on the provider device. For instance, the client application may display a map showing each of the geographic regions 210-220 with a graphical overlay reflecting pricing information for each of the regions.

According to one embodiment, the system transmits initial prices (e.g., IP 147 or IPP 149 of FIG. 1) for a plurality of geographic regions (e.g., 210-220 of FIG. 2) to the provider devices. As described with respect to FIG. 3A, the initial prices can be determined based on data collected by the system such as historical data (e.g., 121 of FIG. 1) and/or short-term data (e.g., parsed data 131) that is collected during the preceding five or ten minutes. The initial prices can be periodically determined (e.g., every five or ten minutes) and the system can periodically transmit the initial prices for each of the regions to the providers (e.g., every five or ten minutes). The initial price is thus an estimate based historical and/or short-term (e.g., past five or ten minutes) trends in supply and/or demand conditions. The provider client application is configured to update the display of the provider devices periodically (e.g., every five minutes) such that the most recently received initial prices are displayed on the provider devices.

After a provider is selected to fulfill a service request, the provider device receives an up-to-date price (e.g., UTDP 157 or UTDPP 159 of FIG. 1) associated with the service request. The up-to-date price can be determined by the system in steps 312-315 of FIG. 3A. In some instances, the up-to-date price is equal to the initial price determined in step 310 (e.g., the initial price did not need to be updated). In other instances, the up-to-date price is a price generated by the system in real-time in step 313 (e.g., the initial price needed to be updated).

Thus, each of the providers receives initial prices a plurality of geographic regions (e.g., 210-220 of FIG. 2). In addition, after being selected for fulfill a service request, a provider receives an up-to-date price (e.g., UTDP 157 or UTDPP 159 of FIG. 1) associated with the service request. The selected provider can evaluate, based on the up-to-date price, whether to accept the assignment to provide the requested service. In this manner, selected providers receive up-to-date pricing information reflecting current (e.g., real-time or instantaneous) supply and demand conditions, which may differ from estimates based on historical and/or short-term data due to unpredictable/stochastic variations in demand and/or supply.

Figure 3B:
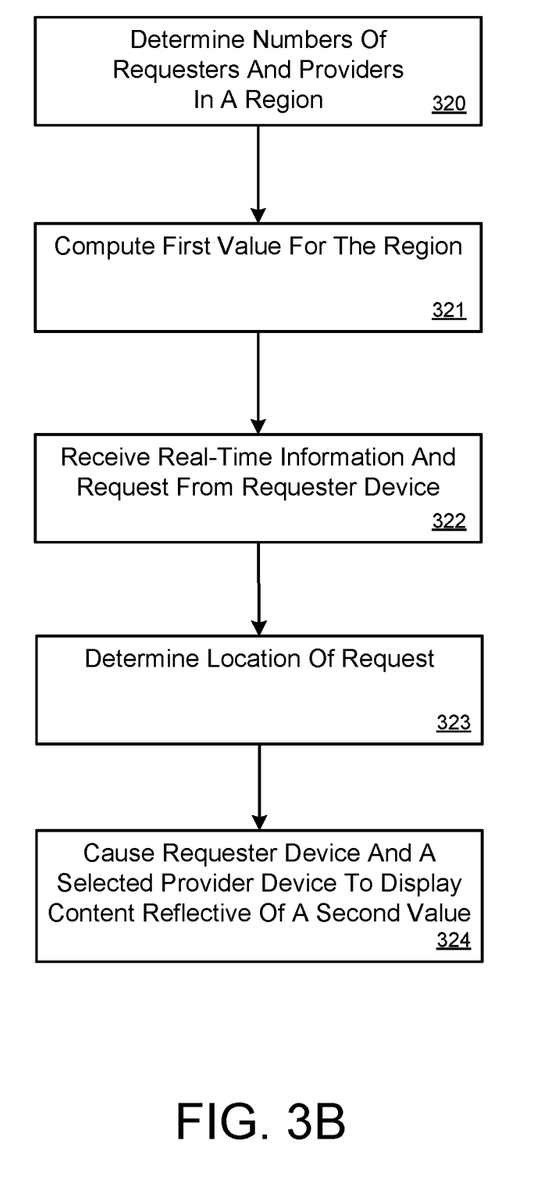
FIG. 3B illustrates a method performed by an on-demand service system to determine an up-to-date value pertaining

FIG. 3B illustrates another example method for operating an on-demand service system, according to an embodiment. The system manages resources for providing an on-demand service over multiple geographic regions by determining one or more values associated with supply and demand conditions.

At step 320, the system determines numbers of requesters and providers of the service in a first geographic region (e.g., region 210 of FIG. 2). The determination can be made by the system based on data received from requester devices (e.g., 180 of FIG. 1) and provider devices (e.g., 190 of FIG. 1). According to embodiments, the determination of numbers of requesters and providers is made periodically (e.g., every five minutes), based on data received from the requester and provider devices during each period.

At step 321, the system determines a first value for the first geographic region based on the determined numbers of requesters and providers of the service in the first geographic region. The first value can be a price or a pricing parameter (e.g., a multiplier relative to a default price). According to embodiments, the determination of the first value is made periodically, based on the periodic determination of the numbers of requesters and providers.

At step 322, the system communites with a requester device to receive real-time information, including location data (e.g., GPS and/or GLONASS), and a request. The request can be a service request or a request for information regarding current supply demand conditions.

At step 323, the system determines a location of the request. The location of the request can be a location of the requester as determined by the location data of received from the requester device. The location of the request can also be a service location (e.g., pick-up, drop-off, or delivery location). In particular, the system can determine which geographic region the location of the request is in and/or whether the location of the request is within the first geographic region.

In response to determining that the location of the request is within the first geographic region, the system can cause the requester device and a selected provider device to display content reflective of a second value associated with the service request, rather than the first value at step 324. The second value can correspond to a value determined in real-time to account for ephemeral and unpredicted variations in supply and demand conditions. The second value can be a price or a pricing parameter (e.g., a multiplier relative to a default value). The second value can be determined in real-time based on supply and demand data or information of geographic regions nearby to the first geographic region. The selected provider device can correspond to a device operated by a provider selected by the system to fulfill the service request.

Hardware Diagrams

Figure 4:
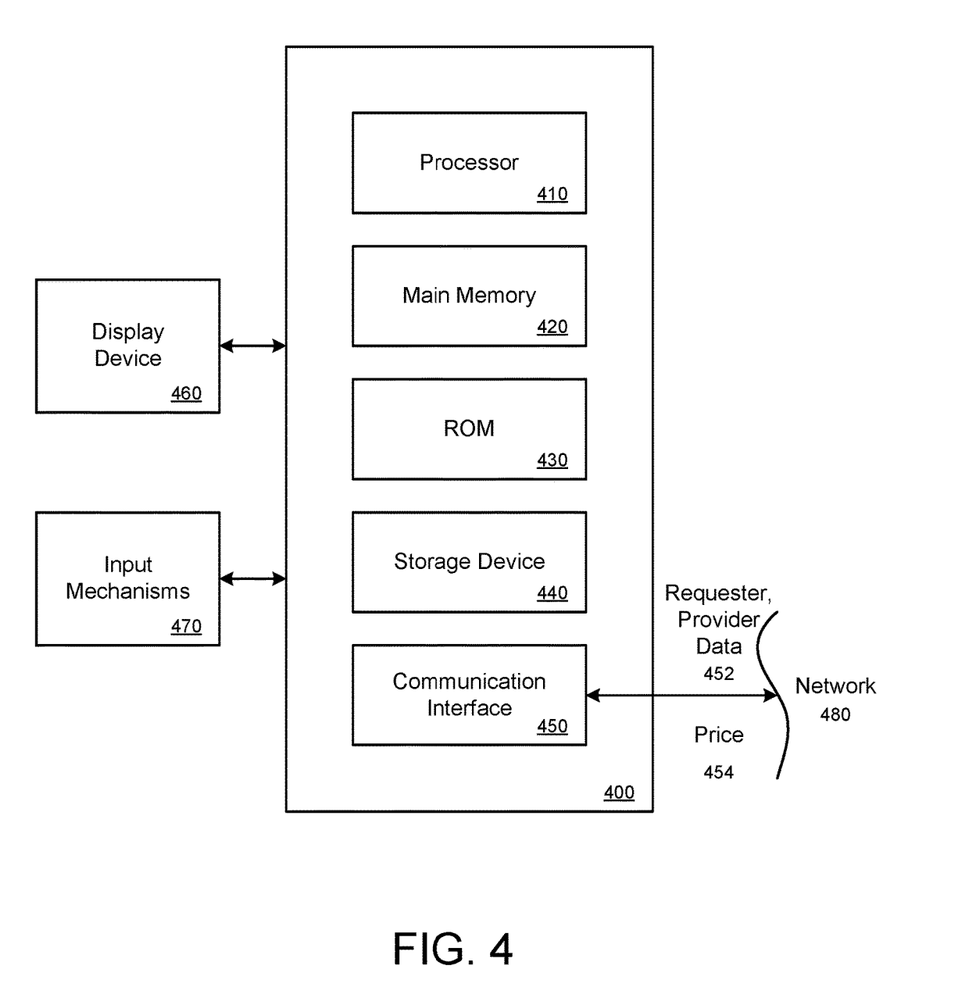
FIG. 4 is a block diagram that illustrates a computer system upon which embodiments described herein may be implemented.

FIG. 4 is a block diagram that illustrates a computer system upon which examples described herein may be implemented. For example, in the context of FIG. 1, system 100 may be implemented using a computer system such as described by FIG. 5. System 100 may also be implemented using a combination of multiple computer systems as described by FIG. 5.

In one implementation, computer system 400 includes processing resources 410, main memory 420, ROM 430, storage device 440, and communication interface 450. Computer system 400 includes at least one processor 410 for processing information. Computer system 400 also includes a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions.

The communication interface 450 can enable the computer system 400 to communicate with one or more networks 480 (e.g., cellular network) through use of the network link (wireless or wireline). Using the network link, the computer system 400 can communicate with one or more computing devices, and one or more servers. In some variations, the computer system 400 can be configured to receive requester data and/or provider data 452 from one or more computing devices (e.g., belonging to users and service providers, respectively) via the network link. The requester data and/or provider data 452 can be processed by the processor 410 and can be stored in, for example, the storage device 440. The processor 410 can process the received data (and other data, such as historical data) in order to adjust the price for a service relative to a default price. The price data 454 can be transmitted to the requester device(s) and/or the provider device(s) over the network 480.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one embodiment, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
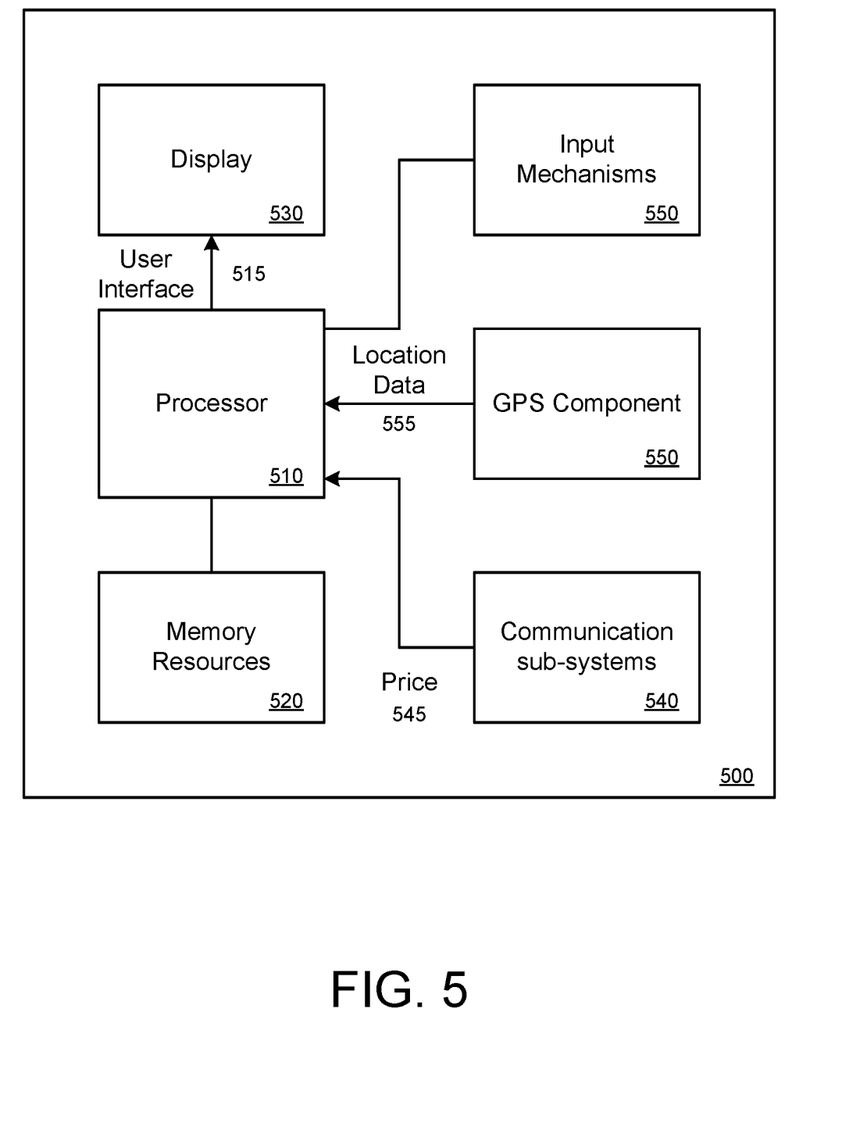
FIG. 5 is a block diagram that illustrates a mobile computing device upon which embodiments described herein may be implemented.

FIG. 5 is a block diagram that illustrates a mobile computing device upon which examples described herein may be implemented. In one embodiment, a computing device 500 may correspond to a mobile computing device, such as a cellular device that is capable of telephony, messaging, and data services. Examples of such devices include smartphones, handsets or tablet devices for cellular carriers. Computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels.

The processor 510 is configured with software and/or other logic to perform one or more processes, steps and other functions described with implementations, such as described by FIGS. 1-4, and elsewhere in the application. Processor 510 is configured, with instructions and data stored in the memory resources 520, to operate a service application as described in FIGS. 1-4. For example, instructions for operating the service application in order to display various user interfaces, such as described in FIGS. 3A-3B, can be stored in the memory resources 520 of the computing device 500. A user can operate the service application so that location data 565 can be determined by the GPS component 560. The location data 565 can provide the current location of the computing device 500 so that it can be used by system 100 (as described in FIG. 1) in arranging the service and in providing adjusted pricing (if any). The communication sub-systems 540 can receive price data 545 over a network from system 100 and provide the price 545 to the processor 510 for displaying the price to the user.

The processor 510 can provide content to the display 530 by executing instructions and/or applications that are stored in the memory resources 520. In some examples, user interfaces 515 can be provided by the processor 510, such as a user interface for the service application (e.g., including a pricing user interface). While FIG. 6 is illustrated for a mobile computing device, one or more embodiments may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is claimed is:

1. A method of performing real-time updates for a network-based service, the method being performed by one or more processors and comprising:
  periodically computing respective values of a parameter of the network-based service for a plurality of geographic regions, including computing a first value of the parameter for a first geographic region and a second value of the parameter for a second geographic region based, at least in part, on data received over a network from a plurality of provider devices and a plurality of requester devices during a first time period;

in response to receiving a request for the network-based service over the network from a first requester device, determining whether to perform real-time update of the first value for the first geographic region, wherein the request for the network-based service is associated with the first geographic region; and in response to determining to perform real-time update of the first value for the first geographic region, (i) determining an updated value of the parameter for the first geographic region based, at least in part, on the second value of the parameter for the second geographic region that is physically adjacent to the first geographic region, (ii) associating the updated value, rather than the first value, with the request for the network-based service, (iii) causing the first requester device to display content reflective of the updated value, rather than the first value, being associated with the request for the network-based service, and (iv) storing the updated value as the value of the parameter for the first geographic region.

2. The method of claim 1, wherein determining whether to perform real-time update for the first value of the first geographic region includes computing a metric associated with the first geographic region and determining whether the metric exceeds or falls below a threshold.

3. The method of claim 2, wherein the metric is an estimated time duration for one or more providers to reach a service location within the first geographic region.

4. The method of claim 2, wherein the metric is a distance between one or more providers and a service location within the first geographic region.

5. The method of claim 2, wherein the metric is a utilization rate of providers.

6. The method of claim 1, wherein determining the updated value for the first geographic region comprises computing a probability that a service request associated with the first geographic region will be fulfilled by a provider located in the second geographic region.

7. The method of claim 1, further comprising:
in response to computing the first value of the parameter of the first geographic region, causing at least some of the plurality of provider devices to display content reflective of the first value being associated with the first geographic region;
identifying a first provider to fulfill the request for the network-based service that is associated with the first geographic region; and
after identifying the first provider for request for the network-based service, causing a first provider device of the first provider to display content of the updated value, rather than the first value, being associated with the request for the network-based service.

8. The method of claim 7, wherein the content reflective of the first value being associated with the first geographic region displayed on at least some of the plurality of provider devices comprises a map.

9. The method of claim 1, further comprising:
computing the first value of the parameter for the first geographic region based, at least in part, on a number of requesters and a number of providers located within the first geographic region during the first time period as indicated by the data received from the plurality of provider devices and the plurality of requester devices.

10. The method of claim 9, wherein the first value comprises an adjustment from a default value, the adjustment being based, at least in part, on the number of requesters and the number of providers located within the first geographic region during the first time period.

11. A computer system comprising:
one or more processors;
one or more memory resources storing instructions that, when executed by the one or more processors, cause the computer system to:
periodically compute respective values of a parameter of a network-based service for a plurality of geographic regions, including computing a first value of the parameter for a first geographic region and a second value of the parameter for a second geographic region based, at least in part, on data received over a network from a plurality of provider devices and a plurality of requester devices during a first time period;
in response to receiving a request for the network-based service over the network from a first requester device, determine whether to perform real-time update of the first value for the first geographic region, wherein the request for the network-based service is associated with the first geographic region; and
in response to determining to perform real-time update of the first value for the first geographic region, (i) determine an updated value of the parameter for the first geographic region based, at least in part, on the second value of the parameter for the second geographic region that is physically adjacent to the first geographic region, (ii) associate the updated value, rather than the first value, with the request for the network-based service, (iii) cause the first requester device to display content reflective of the updated value, rather than the first value, being associated with the request for the network-based service, and (iv) storing the updated value as the value of the parameter for the first geographic region.

12. The computer system of claim 11, wherein determining whether to perform real-time update for the first value of the first geographic region includes computing a metric associated with the first geographic region and determining whether the metric exceeds or falls below a threshold.

13. The computer system of claim 12, wherein the metric is an estimated time duration for one or more providers to reach a service location within the first geographic region.

14. The computer system of claim 12, wherein the metric is a distance between one or more providers and a service location within the first geographic region.

15. The computer system of claim 12, wherein the metric is a utilization rate of providers.

16. The computer system of claim 11, wherein determining the updated value for the first geographic region includes computing a probability that a service request associated with the first geographic region will be fulfilled by a provider located in the second geographic region.

17. The computer system of claim 11, wherein the executed instructions further cause the computer system to:
in response to computing the first value of the parameter of the first geographic region, cause at least some of the plurality of provider devices to display content reflective of the first value being associated with the first geographic region;

identify a first provider to fulfill the request for the network-based service that is associated with the first geographic region; and after identifying the first provider for request for the network-based service, cause a first provider device of the first provider to display content of the updated value, rather than the first value, being associated with the request for the network-based service.

18. The computer system of claim 11, wherein the executed instructions further cause the computer system to: compute the first value of the parameter for the first geographic region based, at least in part, on a number of requesters and a number of providers located within the first geographic region during the first time period as indicated by the data received from the plurality of provider devices and the plurality of requester devices.

19. The computer system of claim 18, wherein the first value comprises an adjustment from a default value, the adjustment being based, at least in part, on the number of requesters and the number of providers located within the first geographic region during the first time period.

20. A non-transitory computer-readable medium storing instructions that, when executed by one or more processors of a computer system, cause the computer system to:

periodically compute respective values of a parameter of a network-based service for a plurality of geographic regions, including computing a first value of the parameter for a first geographic region and a second value of the parameter for a second geographic region based, at least in part, on data received over a network from a plurality of provider devices and a plurality of requester devices during a first time period;

in response to receiving a request for the network-based service over the network from a first requester device, determine whether to perform real-time update of the first value for the first geographic region, wherein the request for the network-based service is associated with the first geographic region; and in response to determining to perform real-time update of the first value for the first geographic region, (i) determine an updated value of the parameter for the first geographic region based, at least in part, on the second value of the parameter for the second geographic region that is physically adjacent to the first geographic region, (ii) associate the updated value, rather than the first value, with the request for the network-based service, (iii) cause the first requester device to display content reflective of the updated value, rather than the first value, being associated with the request for the network-based service, and (iv) store the updated value as the value of the parameter for the first geographic region.

* * * * *